June 13, 1933.  E. F. ROSSMAN ET AL  1,913,513
OSCILLATING PIVOT JOINT
Filed Nov. 11, 1929

Inventors
Edwin F. Rossman
and George W. Elsey
By Spencer Hardman & Fehr
Their Attorneys Patented June 13, 1933

1,913,513

UNITED STATES PATENT OFFICE

EDWIN F. ROSSMAN AND GEORGE W. ELSEY, OF DAYTON, OHIO, ASSIGNORS TO DELCO PRODUCTS CORPORATION, OF DAYTON, OHIO, A CORPORATION OF DELAWARE

OSCILLATING PIVOT JOINT

Application filed November 11, 1929. Serial No. 406,368.

This invention relates to metal-isolating pivot joints connecting two relatively movable parts.

An object of this invention is to provide such a pivot joint which is efficient and long lasting in use without attention of any kind, such as lubrication or adjustment to take up wear.

A more specific object is to provide that small oscillations between the two connected members will be permitted by an internal twist or distortion within the resilient non-metallic bushing without material slipping between any surfaces, while relatively large oscillations between said members will cause a relative slipping between certain metal surfaces especially adapted for such slipping, in order to protect said resilient bushing against excessive internal twisting.

Further objects and advantages of the present invention will be apparent from the following description, reference being had to the accompanying drawing wherein a preferred embodiment of one form of the present invention is clearly shown.

In the drawing.

Similar reference characters refer to similar parts throughout the several views.

Figure 1:
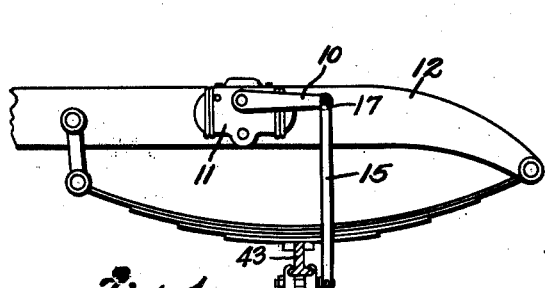
Fig. 1 illustrates somewhat diagrammatically the use of the oscillating pivot joints of this invention for connecting the vertical thrust link to the lever arm of a hydraulic shock absorber and to a fitting fixed to the automobile axle.

Numeral 10 designates the lever arm which actuates the piston in the hydraulic shock absorber unit 11 which is rigidly fixed to the side rail 12 of the automobile chassis frame. The thrust link 15 is connected to the outer end of lever 10 by the metal-isolating oscillating pivot joint of this invention. This joint will now be described in detail. Lever arm 10 has an eye portion 16 at its extremity. The link 15 is bifurcated at its upper end to form a yoke 17 having two opposed prongs 18 separated by a distance somewhat greater than the length of eye portion 16. A resilient non-metallic bushing 20, preferably of soft rubber material is inserted snugly within eye 16 and the two annular end flanges 21 thereon radially overlap the ends of eye portion 16 a small distance. A metallic bearing sleeve 25 is forced into the central aperture of bushing 20 and within sleeve 25 there is inserted the somewhat longer tubular bearing journal 26 whose length is equal to the desired final distance between the yoke prongs 18. The link 15 is then applied so that its yoke 17 embraces the eye 16 and the rubber bushing 20. Preferably the prongs 18 are originally spaced somewhat further apart than in the final position shown in Fig. 2, and snugly engage the ends of bushing 20 when first assembled thereupon. Then the cross bolt is inserted through apertures in prongs 18 and through the tubular journal 26 and a suitable lock washer 32 and nut 31 applied. Now when nut 31 is drawn up tight the prongs 18 are bent inwardly thereby and compress the resilient bushing 20 to put the same under an initial compression and confine the rubber except at the annular clearance spaces 21 between the flat inner faces of said prongs 18 and the ends of eye portion 16 where the resilient rubber material 20 bulges out somewhat. This initial compression on the rubber material forces the same into a substantially non-slipping bond with the confining metal walls, namely, eye 16, bearing sleeve 25, and the inner faces of prongs 18. Preferably sleeve 25 is made so that its diameter will be reduced by such compression from the surrounding rubber, that is, it may be in one piece with one or more longitudinal slots therein or it may be in two or more pieces with small longitudinal gaps therebetween, the purpose being that the compressed rubber bushing will maintain the bearing sleeve 25 contracted upon the bearing journal 26 with a substantial frictional contact therebetween at all times regardless of wear. Also preferably the inner surface of sleeve 25 is provided with a suitable self-lubricating means such as a large number of shallow recesses or depressions filled with a graphite compound or similar solid lubricant which will remain in place for long periods of time without any attention. Such lubrication is for the purpose of avoiding wear at the relatively sliding surfaces of parts 25 and 26.

Figure 3:
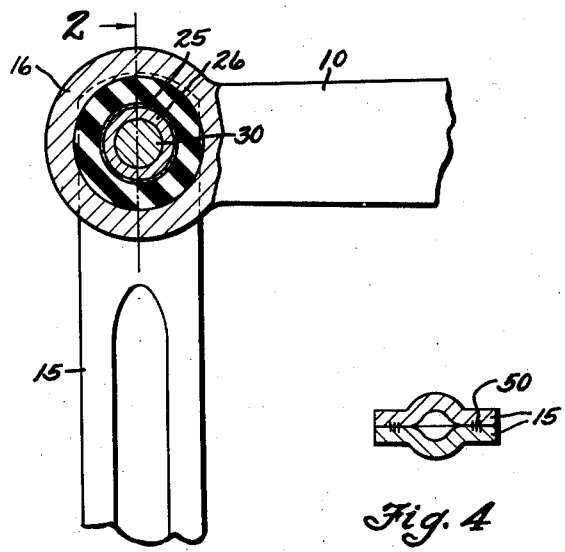
Fig. 3 is a vertical section taken on line 3—3 of Fig. 2.

In operation, forces may be transmitted from link 15 to lever 10, or vice versa, through the resilient rubber bushing 20 which therefore provides a resilient non-metallic connection. Small angular movement of link 15 to right or left (as seen in Fig. 3) is permitted by an internal twist within the bushing 20 and without any slipping of any surface upon another. Thus when this joint is used on leaf spring shock absorbers found on present day automobiles, the vast majority of the relative oscillations between parts 10 and 15 will be taken by internal twist within the resilient bushing 20, thus avoiding substantially all wear on the parts. However, for larger relative angular movement between link 15 and lever 10, the sleeve 25 will slip or rotate upon the journal 26 since the frictional contact holding these parts relatively stationary for small oscillations will be overcome.

Figure 2:
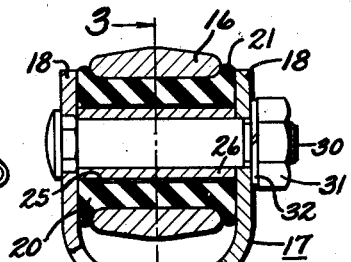
Fig. 2 shows the thrust link on a larger scale with a vertical section through the two end joints taken on line 2—2 of Fig. 3.

Small lateral swinging of link 15 to the right or left (as seen in Fig. 2) is also permitted by the distortion of the resilient rubber bushing 20 and its flanges 21 as will be obvious from the drawing. Such small lateral swinging occurs during "side-sway" or relative lateral movement of the chassis frame 12 to the wheel axle.

The lower end of link 15 is shown pivotally mounted at 40 upon an eye member 41 having a shank 42 which is rigidly fixed to the axle 43. This joint 40 is a duplicate of the upper joint described above except that the bearing sleeve 25 is omitted entirely. The relative angular oscillation between link 15 and eye member 41 is very small compared to that with the eye member 16 and hence all relative oscillations between the parts at the lower end of link 15 may be suitably taken by internal twist within the resilient bushing 20.

Figure 4:
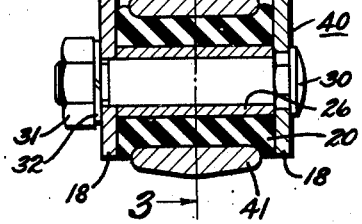
Fig. 4 is a transverse section taken on line 4—4 of Fig. 2.

Link 15 may be very economically and simply made from two bars, each having its ends bent outwardly to form the prongs 18, and deformed in section as shown in Fig. 4, and spot welded together at a series of points along their contacting portions as shown at 50 in Fig. 4.

Obviously the link 15 may be disassembled or assembled upon members 10 and 41 simply by removing the bolts 30 and slipping the yokes over the ends of the resilient bushings 20 and without disturbing the bushings 20 and inner sleeves.

While the form of embodiment of the present invention as herein disclosed, constitutes a preferred form, it is to be understood that other forms might be adopted, all coming within the scope of the claims which follow.

What is claimed is as follows:

1. In a metal-isolating pivot joint connecting two relatively oscillating parts, in combination, an eye rigid with one of said parts, an initially compressed resilient non-metallic bushing within said eye, side links on opposite sides of said eye and secured to the other of said parts, a spacer tube within said bushing and extending between said links for limiting axial distortion of said bushing, a pin extending through said spacer tube and clamping same rigid with said links, and a contractible metal sleeve being sufficiently contracted to have a friction bearing upon said tube and having a substantially non-slipping bond with the inner periphery of said bushing, the degree of friction of said friction bearing being such that relatively small oscillations between said relatively oscillating parts are taken only by internal twist in said resilient bushing and relatively large oscillations therebetween cause a rotary slipping of said friction bearing.

2. In a metal isolating pivot joint connecting two relatively oscillating parts, in combination, a metal fork rigid with one of said connected parts, and having two spaced projections capable of being flexed toward each other, a spacer tube extending transversely between said projections, a pin extending through said spacer tube and aligned holes in said projections and having means associated therewith for rigidly clamping the ends of said spacer tube against the inside surfaces of said spaced projections, a contractible metal sleeve bearing upon said spacer tube, a resilient rubber bushing surrounding said contractible sleeve, and a metal eye rigid with the other of said connected parts and surrounding and confining said rubber bushing, the relative proportion of the parts being such that when assembled by the forcing of said sleeve into said bushing the rubber of said bushing is placed and maintained in a stressed condition whereby said sleeve is held in tight frictional fit on said spacer tube.

In testimony whereof we hereto affix our signatures.

EDWIN F. ROSSMAN.
GEORGE W. ELSEY.